United States Patent [19]

Weddigen

[11] 4,444,970
[45] Apr. 24, 1984

[54] PROCESS FOR PREPARING POLYACETYLENES AND SUBSTITUTED POLYACETYLENES PRODUCED THEREBY

[75] Inventor: Gert Weddigen, Heidelberg, Fed. Rep. of Germany

[73] Assignee: Brown, Boveri & Cie Aktiengesellschaft, Mannheim, Fed. Rep. of Germany

[21] Appl. No.: 413,165

[22] Filed: Aug. 30, 1982

[30] Foreign Application Priority Data

Sep. 1, 1981 [DE] Fed. Rep. of Germany ....... 3134529

[51] Int. Cl.³ .......................................... C08F 238/02
[52] U.S. Cl. ..................................... 526/285; 526/90
[58] Field of Search ................................. 526/285, 90

[56] References Cited

U.S. PATENT DOCUMENTS

| | | | |
|---|---|---|---|
| 3,051,693 | 8/1962 | Leto | 526/285 |
| 3,097,195 | 7/1963 | Kennedy | 526/142 |
| 3,098,843 | 7/1963 | Luttinger | 526/285 |
| 3,174,956 | 3/1965 | Luttinger | 526/285 |

FOREIGN PATENT DOCUMENTS 52-20511  6/1977  Japan .................................. 526/285

OTHER PUBLICATIONS

Journal of Organometallic Chemistry-vol. 60, Greco et al., (1973), pp. 115–124.

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

Substituted polyacetylenes are prepared by contacting a mixture of acetylene and a substituted acetylene with a polymerization catalyst. The substituents on the polyacetylene chains increase the distance between neighboring parallel chains and shield the chains from attack by oxygen, thereby preventing crosslinking of the chains.

1 Claim, No Drawings

PROCESS FOR PREPARING POLYACETYLENES AND SUBSTITUTED POLYACETYLENES PRODUCED THEREBY

BACKGROUND OF THE INVENTION

1. Field of the Invention

This invention relates to a process for preparing polyacetylenes and more particularly to preparing polyacetylenes by catalytic polymerization. The invention also relates to substituted polyacetylenes prepared by this process.

2. Description of the Prior Art

Polyacetylenes are a kind of polymer, i.e., they belong to the group of macromolecular, natural or synthetic compounds which are formed, e.g., by polymerization from monomers. In polymerization, macromolecules are constructed by chemical reactions. At each reaction step a monomer molecule M is added to a polymer molecule P: $P^*_m + M \rightarrow P^*_{n+1}$. In this expression, P* signifies the presence of an activated state. This active center is located at either end of the growing polymer chain. Suitable monomers for polymerization include unsaturated monomers such as acetylene, ethylene, styrene and acrylonitrile which combine to form long molecular chains having different degrees of polymerization. Polyacetylenes can be prepared simple by introduction of the acetylene into a solution containing a catalyst. By suitable choice of catalyst a sheet can also be formed (H. Shirakawa, S. Ikeda, Polymer J. 2,231, 1971). The preparation of polyacetylene in powder form is also known (L. B. Luttinger, J. Org. Chem. 27, 1591, 1962).

Polyacetylenes are made up, as pointed out above, of polymer chains. In such chains the bonds between the carbon atoms are alternately double and single bonds, as shown in the following example:

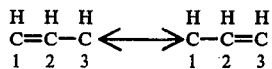

The polyacetylenes prepared by known processes become brittle very soon after they are prepared, and they react with oxygen, especially when they are exposed to the action of air and/or UV-light. From the structure shown above, the elementary analysis of polyacetylene must yield a C/H-ratio of 1, since long chains are present in the polymer, and thus the hydrogen content of the terminal positions of the chain can be neglected. In practice, however, the measured C/H-ratio is not equal to 1. This is caused by crosslinking of the chains which make up the polymer. This crosslinking occurs both in the presence and absence of oxygen and/or UV-light. The consequence of this reactivity between the chains of the polymers is a relatively high degree of crosslinking and a relatively high molecular weight, over $5 \cdot 10^5$. The crosslinking reaction taking place in polyacetylenes can be detected because the polyacetylene experiences an increase in weight of 15% over a two-weeks period. Simultaneously, carbonyl bands can be detected in the infrared spectrum. Furthermore, the polyacetylene exhibits a decrease in its elasticity. Cracks can also be detected in the polyethylene. This crosslinked chain has the disadvantage that the polymer itself no longer softens at temperatures above 300° C. It is also no longer possible to dissolve the polymer in a solvent.

In order that polyacetylenes can be used in injection molding or coating, however, these are necessary conditions which must be unconditionally fulfilled.

Therefore, a need has continued to exist for a polyacetylene which remains soluble and meltable because it is not subject to cross-linking, particularly by the action of oxygen.

SUMMARY OF THE INVENTION

Accordingly, it is an object of this invention to provide a process for preparing polyacetylenes.

A further object of the preparation of polyacetylenes which remain soluble and meltable.

A further object is to prepare polyacetylene which have a reduced tendency to cross-linking.

A further object of the invention is to prepare polyacetylenes which have a decreased tendency to react with oxygen.

These and other objects of the invention will become apparent from the description which follows.

The objects of the invention have now been attained by a process wherein acetylene and acetylene derivatives are copolymerized in the presence of metathesis catalysts and/or Luttinger catalysts, and that in at least a portion of the polyacetylene chain at least a portion of the individual hydrogen atoms are replaced by substituents which increase the distance d between neighboring chains.

DETAILED DESCRIPTION OF THE INVENTION AND PREFERRED EMBODIMENTS

Preferably, 1 to 50 mol % of acetylene derivatives are used in the polymerization, calculated on the total amount of acetylene used. In the preparation of polyacetylene according to the invention, about 0.5 to 25% of the hydrogen atoms in the polymer chain are optionally replaced by bulky substituents R. Preferably, these substituents themselves relatively inert to the action of oxygen. In the polymerization of acetylene and acetylene derivatives to polyacetylene an aliphatic substituent R can be introduced. Preferably butyl is used as the substituent R. An aromatic substituent R can also be used to replace the hydrogen atom in the polymerization. Preferably, phenyl is used as the aromatic substituent. Instead of either of the abovementioned substituents R a heterocyclic substituent R can also be introduced. As catalysts for the polymerization, metathesis catalysts and/or Luttinger catalysts can be used. For the metathesis catalyst, there can be used, e.g., molybdenum pentachloride or molybdenum hexachloride. An adduct of molybdenum hexachloride and ethanol in a molar ratio of 1:1 is also usable as a metathesis catalyst.

Tungsten pentachloride or tungsten hexachloride is also suitable as a metathesis catalyst. An adduct of tungsten hexachloride and ethanol or tungsten hexachloride and water, wherein in each case the molar ratio is 1:1, can also be used as a metathesis catalyst.

For improved control of the molecular weight, 5 to 20 mole % of $NaBH_4$ (sodium borohydride) is added to the metathesis catalyst, calculated on the total quantity of metathesis catalyst used. Sodium borohydride and cobalt nitrate are the preferable Lottinger catalysts for the polymerization.

According to the invention, the hydrogen atoms of the polyacetylene chain are partially replaced by the above-described bulky substituents R. This produces an increases the distance d between parallel, immediately adjacent polymer chains. Thereby, the crosslinking of the polymer chains is prevented, and especially the formation of hydroperoxides is hindered. The polyacetylene prepared by the above described polymerization technique is soluble and meltable.

The following illustration shows the region of two parallel polyacetylene chains, whose hydrogen atoms have not been partially replaced by a substituent R according to the invention.

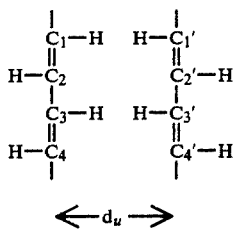

For the unsubstituted polyacetylene the interchain distance at closest approach of the chains between the C-atoms is limited to a value $d_u = 2r_H + 2d_{CH}$, wherein $r_H$ = the radius of a hydrogen atom and $d_{CH}$ represents the C-H bond distance. If the polyacetylene is exposed to the action of oxygen, a reaction of the polyacetylene with oxygen occurs, in particular an insertion of oxygen between the region of the adjacent hydrogen atoms, so that hydroperoxides are formed which spontaneously cleave. In this way a direct bond is formed between $C_1$, $C_1'$ or $C_3$, $C_3'$ of the polymer chain so that these atoms are linked to one another. The subsequent example shows two parallel polyacetylene chains in which a partial replacement of the hydrogen atoms, in each case by bulky substituent, has taken place.

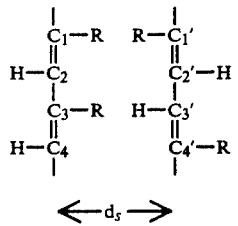

The interchain distance has increased in this example to the illustrated value $d_s$.

The following example shows a portion of a polymer chain in which a hydrogen atom is replaced with a butyl group.

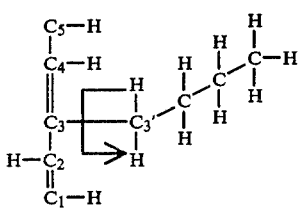

In the embodiment illustrated here the hydrogen atom, which is normally bonded to the $C_3$ of the polyacetylene chain, is replaced with butyl. This substituent can rotate around the C-C bond between $C_3$ of the polyacetylene chain and $C_3'$ of the butyl. By this process the neighboring C-H bonds of C-atoms 1, 2, 4 and 5 of the polyacetylene chain are sterically shielded against reaction with oxygen. When additional polyacetylene chains lie parallel to this chain, the five closest C-H bonds of these chains can also be sterically shielded against reaction with oxygen by the rotating butyl of the first polyacetylene chain.

Suitable substituents R include aliphatic, aromatic and heterocyclic groups which are sufficiently large to provide the increased interchain distance discussed above. Preferred aliphatic groups include straight or branched chain groups having at least 4 carbon atoms. Preferred aromatic groups include aryl and substituted aryl groups having at least 6 carbon atoms. Preferred heterocyclic groups include those having at least 5 atoms in the ring and may include, for example, rings having nitrogen, oxygen and sulfur in the heterocyclic ring. Since the principal purpose of the substituents R is to provide bulk which increases the interchain distance and shields the adjacent hydrogen atoms from attack by oxygen, the choice of substituent is not critical and will be evident to one skilled in the art from this disclosure.

Having generally described the invention, a more complete understanding can be obtained by reference to certain specific examples, which are provided herein for purposes of illustration only and are not intended to be limiting unless otherwise specified. In the first example the polymerization is carried out using a metathesis catalyst. In the second example a Luttinger catalyst is used for the polymerization.

EXAMPLE 1

In the following example 270 mg of molybdenum pentachloride is used as a catalyst. 1,2-dichloroethane is used as an additional solvent. For the preparation of polyacetylene according to the invention 50 ml of 1,2-dichloroethane in a 100 ml 3-neck flask are saturated with acetylene gas from which phosphine and hydrogen sulfide impurities are removed by scrubbing liquids. As indicated by a Bunsen coefficient of about 2.5 at 20° C. the total quantity of dissolved acetylene amounts to about 125 mg. Thereupon a solution of 40 mg of phenylacetylene, dissolved in 1,2-dichloroethane, is sprayed in. Then the catalyst, in particular molybdenum pentachloride, is added to the solution. Acetylene gas is continuously introduced into the solution with stirring at a flow rate of 6 l/h. The amount of phenylacetylene used up is replaced by addition of 50 mg of phenylacetylene at 15 minute intervals. During the reaction the solution at first exhibits a brown-orange color and later becomes deep black. After 2 hours the reaction is terminated. The residual acetylene gas iss removed with a nitrogen purge. The catalyst is thoroughly removed by extraction with chloroform. In this reaction 1.5 g of polyacetylene is obtained. The infrared spectrum of this polyacetylene shows absorption bands at wave lengths, among others, of 1010 cm$^{-1}$ and 700 cm$^{-1}$. This is an indication that both acetylene monomers and phenylacetylene monomers are incorporated into the polymer chain.

EXAMPLE 2

In the following example a Luttinger catalyst is used in the polymerization. In the preparation of the polyacetylene the reaction vessel is first purged with nitrogen. Then 10 g of phenylacetylene, 1 g of aluminum turnings as well as 0.5 g of NaBH$_4$ (sodium borohydride) are introduced. With stirring and additional nitrogen purge, 0.35 g of Co(NO₃)₂ (cobalt nitrate) and 5 ml of ethanol are added. The whole procedure is carried out within 4 minutes, during which the temperature rises to about 45° C. This catalyst solution is cooled somewhat using a water bath. After 10 minutes acetylene is passed into this catalyst solution at a rate of about 6 l/h. After 5 hours this process is terminated. Then the flask was purged for 20 minutes with nitrogen. Then about 50 ml of acetone is added to the reaction solution. The solution is then cooled in an ice bath and filtered, and any residue remaining on the filter is washed with 80 ml of acetone. The filtrate is concentrated in a rotary evaporator. The reaction product is about 5 g of brown-black viscous resin. This resin is taken up in acetone and washed with ethanol. Then the reaction product is cooled to a temperature of about −18° C. Then the residue is collected on a fritted glass filter and dried at 90° C. The final product iss polyacetylene in powder form, which has a yellow color. The powder (M.P. about 120° C.) can be dissolved in CHCl₃. The polyacetylene so obtained exhibits no alternation in weight during a test period of 6 weeks, during which it was exposed to the action of air.

Having now fully described the invention, it will be apparent to one of ordinary skill in the art that many changes and modifications can be made thereto without departing from the spirit or scope of the invention as set forth herein.

What is claimed as new and sought to be protected by Letters Patent of the United States is:

1. A process for preparing a substituted polyacetylene by catalytic polymerization which comprises copolymerizing acetylene gas and phenylacetylene in the presence of tungsten pentachloride at a temperature of about 20° C. or greater wherein about 0.5 to 25% of the hydrogen atoms in the copolymer chains are replaced by phenyl groups, thereby producing an interchain distance between adjacent copolymer chains sufficient to hinder oxidative crosslinking therebetween.

* * * * *